United States Patent [19]

Yunoki

[11] Patent Number: 5,581,611
[45] Date of Patent: Dec. 3, 1996

[54] METHOD FOR CONTROLLING ADVANCED-FUNCTION UNIVERSAL PERSONAL TELECOMMUNICATION SERVICES

[75] Inventor: Hideo Yunoki, Kawasaki, Japan

[73] Assignee: Fujitsu Limited, Kawasaki, Japan

[21] Appl. No.: 10,308

[22] Filed: Jan. 28, 1993

[30] Foreign Application Priority Data

Jan. 28, 1992 [JP] Japan .................................. 4-013076

[51] Int. Cl.$^6$ ........................................................ H04M 3/46
[52] U.S. Cl. .................... 379/211; 379/201; 379/207; 379/210; 379/216
[58] Field of Search ......................... 379/210, 211, 379/212, 216, 201, 355, 207

[56] References Cited

U.S. PATENT DOCUMENTS

| | | | |
|---|---|---|---|
| 4,313,035 | 1/1982 | Jordan et al. | 379/211 |
| 4,611,094 | 9/1986 | Asmuth et al. | 379/201 |
| 4,926,462 | 5/1990 | Ladd et al. | 379/67 |
| 5,027,384 | 6/1991 | Morganstein | 379/212 |
| 5,034,976 | 7/1991 | Sato | 379/355 |
| 5,204,894 | 4/1993 | Darden | 379/216 |
| 5,206,901 | 4/1993 | Harlow et al. | 379/211 |

FOREIGN PATENT DOCUMENTS

| | | |
|---|---|---|
| 0451693 | 10/1991 | European Pat. Off. . |
| 477854A | 1/1992 | European Pat. Off. ............... 379/216 |
| 4985593 | 8/1992 | European Pat. Off. ............... 379/211 |
| 61-100069 | 5/1986 | Japan ................................ 379/211 |
| 1126209 | 9/1968 | United Kingdom ................... 379/211 |
| 2198011 | 6/1988 | United Kingdom . |
| WO85/00489 | 1/1985 | WIPO . |
| WO91/11874 | 8/1991 | WIPO . |

OTHER PUBLICATIONS

Batten, "Personal Communications Services and the Intelligent Network," Aug. 1990, British Tellecommunications Engineering, vol. 9. pp. 88–91.

Primary Examiner—Krista M. Zele
Assistant Examiner—Daniel S. Hunter
Attorney, Agent, or Firm—Staas & Halsey

[57] ABSTRACT

An exchange control portion and a service control portion are provided on the exchange network side. The service control portion is provided with a PTN management table. When a subscriber dials a special number, the service control portion is activated. Thus, the service control portion sends to the subscriber a command for requesting him to input his PTN. When the subscriber inputs information identifying his PTN, the service control portion controls data relevant to the subscriber. When the service control portion receives the PTN of a receiving subscriber according to the input command thereof, it detects the telephone number of the receiving subscriber using the PTN management table. Thereby, the exchange control portion connects the subscriber to the receiving subscriber using the telephone number received or detected.

14 Claims, 14 Drawing Sheets

PTN MANAGEMENT TABLE

MOVING SUBSCRIBER CALL HISTORY TABLE

SEQUENTIAL RETRIEVAL DIALING TABLE

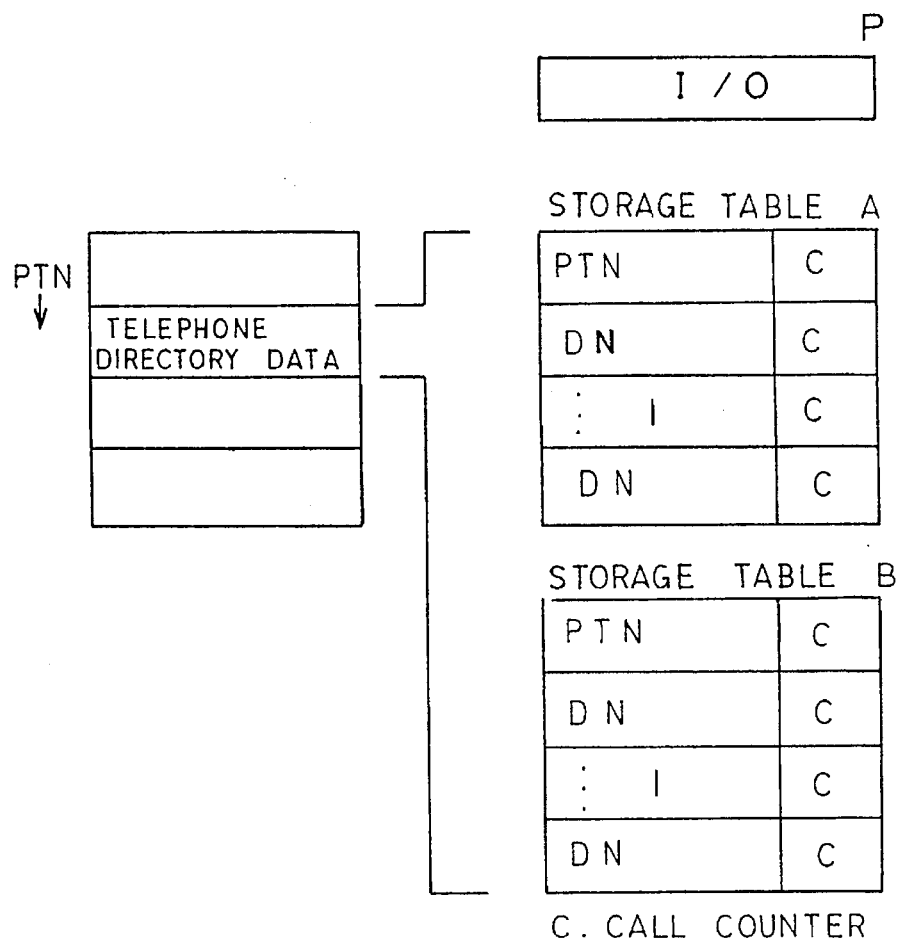
Fig. 6A
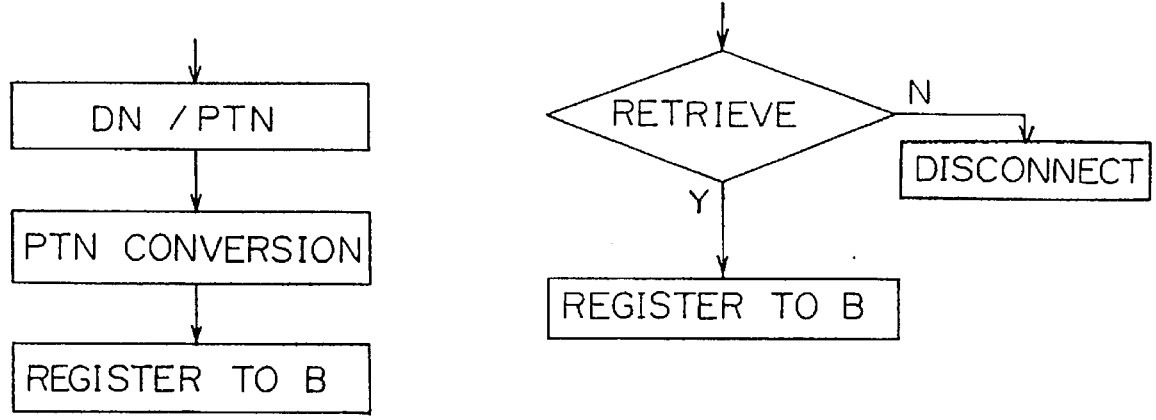
Fig. 6B
Fig. 6C

METHOD FOR CONTROLLING ADVANCED-FUNCTION UNIVERSAL PERSONAL TELECOMMUNICATION SERVICES

BACKGROUND OF THE INVENTION

1. Field of the Invention

The present invention relates to a method for controlling advanced-function universal personal telecommunication (UPT) services.

2. Description of the Related Art

In recent years, UPT services have been studied with regard to new telecommunication service techniques by the CCITT (Consultative Committee for International Telephony and Telegraphy) and others. The UPT services are designed to provide subscribers with a variety of services using personal numbers assigned them through a public exchange network. An implementation of the method for controlling the UPT services at a realistic level is desired.

Although the UPT services are still being studied by the CCITT, it is said that they will provide subscribers with such communication services as calling other subscribers using personal numbers assigned them as well as their telephone numbers. PTNs (Personal Telecommunication Numbers) which are different from conventional telephone numbers (also referred to as DNs (Directory Numbers)) are special for subscribers. When a sending subscriber dials the PTN of a receiving subscriber, the former can access the latter. Moreover, when a sending subscriber dials a special number for a PTN charging service, the connection charge for a call that follows is charged to his PTN rather than the DN with which he will call.

These services will be provided by a new network system referred to as an AIN (Advanced Intelligent Network), which is an improved system of the new network system referred to as an IN (Intelligent Network).

Of the UPT services, the following service is known. In an exchange network where the terminal number (telephone number) of a telephone set and so forth of a receiving subscriber according to his PTN has been registered, when a sending subscriber dials the PTN of the receiving subscriber, the DN according to the PTN is retrieved from the network and then the telephone set of the sending subscriber is connected to the telephone set of the receiving subscriber so as to call the receiving subscriber.

However, in this service controlling method, if a receiving subscriber who is going from one site to another site is called or if an access to a subscriber who is not at a registered site is attempted, when the network calls a telephone set registered to the receiving subscriber since the receiving subscriber cannot answer the call, the sending subscriber cannot communicate with the receiving subscriber.

SUMMARY OF THE INVENTION

An object of the present invention is to provide advanced-function UPT services such as calling a subscriber with his PTN, registering sites different from a permanent site, and recording and retrieving a call history.

Another object of the present invention is to provide advanced UPT services such as calling a receiving subscriber with either his PTN or his DN, announcing an absence of a receiving subscriber who is changing locations, and recording a retrievable call history of calls received when a receiving subscriber is absent.

The present invention is a method of controlling an advanced-function UPT (Universal Personal Telecommunication) service, for assigning to a subscriber a unique PTN (Personal Telecommunication Number) and providing the service over an exchange network with the PTN, the exchange network having an exchange control portion and a service control portion, the service control portion having a PTN management table for storing data such as a telephone number corresponding to the PTN and for executing the service according to a special number, the method comprising the steps of (a) dialing a special number of the UPT service so as to activate the service control portion, (b) sending to a sending subscriber a PTN sending command, (c) receiving information representing the PTN or information representing a non-PTN from the sending subscriber, (d) checking and matching the sending subscriber with the information, (e) sending to the sending subscriber a receiving subscriber input command, (f) receiving the PTN or telephone number of the receiving subscriber from the sending subscriber, (g) detecting the telephone number of the receiving subscriber using the PTN management table when the PTN is received, and (h) connecting the sending subscriber to the receiving subscriber using the telephone number received or detected, wherein the step (a) is performed by the sending subscriber, the steps (b) to (g) are performed by the service control portion, and the step (h) is performed by the exchange control portion.

According to the present invention, a subscriber can select whether to use his PTN (Personal Telecommunication Number). When the subscriber uses the PTN, the connection charge can be charged to the PTN rather than the telephone set that he uses. In addition, since a sending subscriber can designate a receiving subscriber by his PTN or DN, the flexibility of operation increases.

When a subscriber changes the telephone number corresponding to his PTN, while he is changing locations, he can designate a time period for which it takes for him to arrive at his destination. Thus, even if other subscribers call the PTN, they can receive an announcement of his changing locations. In addition, since a history of calls received while the subscriber is changing locations is recorded and he can retrieve information such as the names and DNs of the sending subscribers, he can insure making contact with them.

When a receiving subscriber is called using his PTN and he does not answer, DNs which have been registered in the sequential retrieval dialing table can be sequentially and automatically called.

A telephone directory corresponding to a PTN user is automatically updated without registration thereof whenever he is accessed. When a subscriber uses his telephone directory, the content thereof is displayed sequentially. When the user sends a signal for designating a desired receiving subscriber, the subscriber is automatically called and connected.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 (B) is a schematic diagram for explaining a moving subscriber call history table stored in the database;

FIG. 5 (C) is a schematic diagram for explaining a sequential retrieval dialing table stored in the database;

FIGS. 6A, 6B and 6C are schematic diagrams for explaining tables stored in the database;

FIG. 13 is a flowchart of a storage table substitution process;

DESCRIPTION OF PREFERRED EMBODIMENTS

Figure 1:
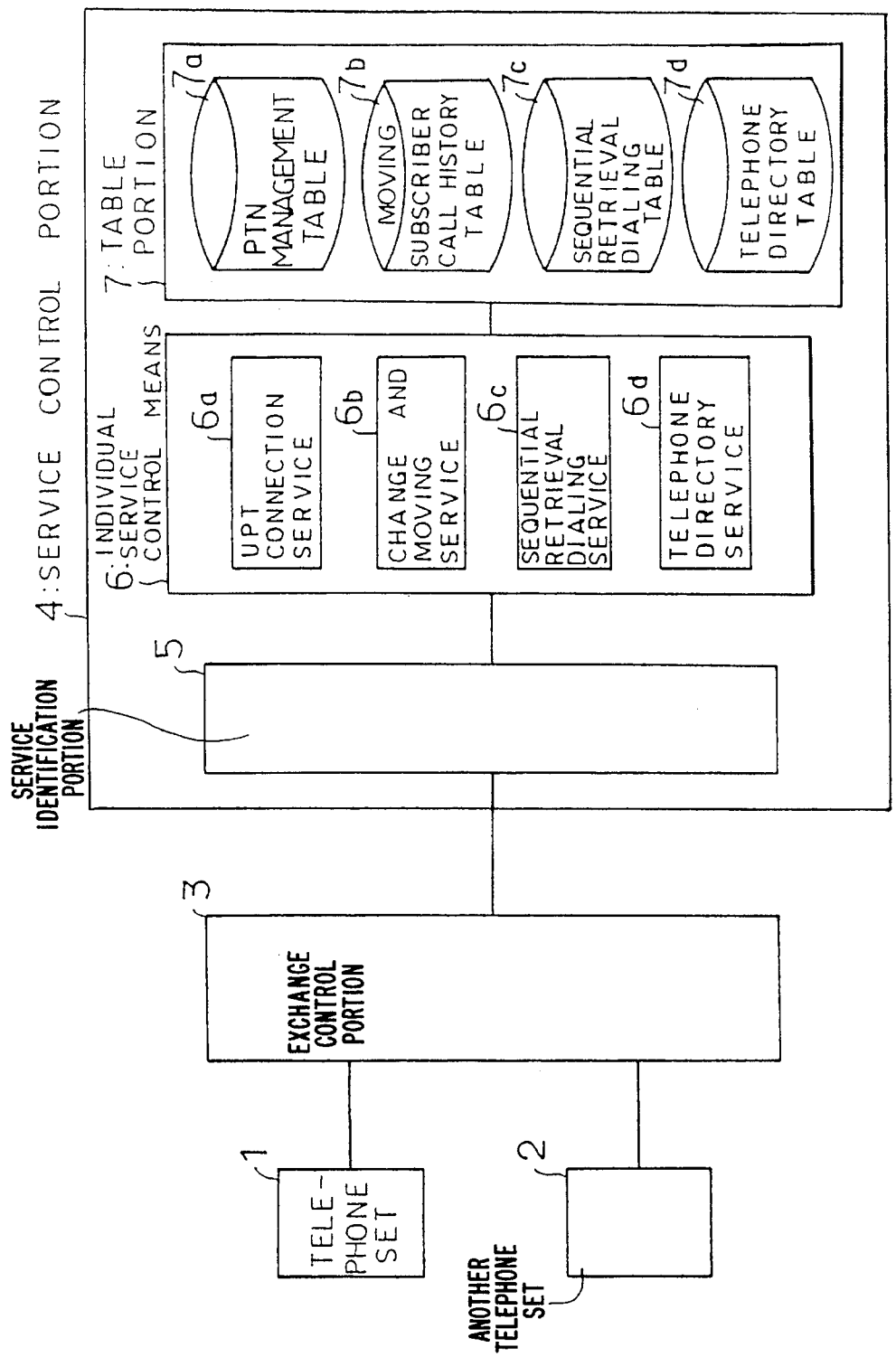
FIG. 1 is a block diagram for explaining the theory of the present invention.

FIG. 1 is a block diagram for explaining the theory of the present invention. In the figure, reference numeral 1 is a telephone set. Reference numeral 2 is another telephone set. Reference numeral 3 is an exchange control portion containing a switching mechanism. Reference numeral 4 is a service control portion. Reference numeral 5 is a service identification portion. Reference numeral 6 is an individual service control means for executing a plurality of services (6a to 6d). Reference numeral 7 is a table portion for storing tables for use in the services. Reference numeral 7a is a PTN management table. Reference numeral 7b is a sequential retrieval dialing table. Reference numeral 7c is a location-changing subscriber call history table. Reference numeral 7d is a telephone directory table.

Next, with reference to FIG. 1, the operation of each portion in accordance with the present invention will be described.

To allow subscribers to have UPT services, PTNs (Personal Telecommunication Numbers) should have been assigned them and DNs and data corresponding to the PTNs should have been registered in the table portion 7 of the service control portion 4.

(1) UPT calling service

When a subscriber dials a special number for a UPT calling service from his telephone set 1 to call the telephone set 2 of another subscriber, this special number is sent to the service control portion 4 through the exchange control portion 3. When the service identification portion 5 identifies the special number and the requested service type, it activates the individual service control means 6 (for example, the UPT connection service control means 6a). When the subscriber of the telephone set 1 (hereinafter referred to as the subscriber 1) sends his PTN to the UPT connection service control means 6a through the exchange control portion 3, it determines whether or not his PTN has been authorized by using data stored in the PTN management table 7a. When the PTN has been authorized, the UPT connection service control means 6a requests the subscriber 1 to input information designating the receiving subscriber.

When the subscriber 1 sends the PTN or DN of the receiving subscriber, the UPT connection service means 6a identifies it. When receiving the PTN, the UPT connection service means 6a converts it into a DN by using the PTN management table 7a. The UPT connection service means 6a sends to the exchange control portion 3 the telephone number, which has been converted from the PTN or received directly from the subscriber 1, along with a connection command. The exchange control portion 3 connects the telephone set 2 of the receiving subscriber with the DN (this subscriber is hereinafter referred to as the subscriber 2) to the subscriber 1.

(2) Change and moving subscriber registration service

When the subscriber 1 dials a special number for a change and moving subscriber registration service, this special number is sent to the service control portion 4 through the exchange control portion 3. The special number is identified by the service identification portion 5. The service identification portion 5 activates the change and moving subscriber registration service control portion 6b. Thereafter, the change and moving subscriber registration service control portion 6b sends an input request to the subscriber 1 through the exchange control portion 3. When the subscriber 1 inputs his PTN, a DN to be changed or transferred, time information (date and time) relevant to validity of the change or transferring, and so forth, these data are registered in the PTN area of the subscriber 1 in the PTN management table 7a. While the subscriber 1 is changing locations, when the telephone set 2 of the other subscriber calls the PTN of the subscriber 1, the service control portion 4 determines whether or not the subscriber 1 is changing locations in accordance with the time information stored in the PTN management table 7a. When the subscriber 1 is changing locations, the service control portion 4 commands the exchange control portion 3 to inform the subscriber 2 that the subscriber 1 is now changing locations and the subscriber 1 will call back the subscriber 2 later.

The DN and the time of each call received while the subscriber 1 was changing locations are stored in the moving subscriber call history table 7b. When the subscriber 1 dials a special number for retrieving calls received while he was changing locations and then inputs his PTN, the change and moving subscriber service control means 6b of the service control portion 4 retrieves the DN and time of each call received that were stored in the moving subscriber call history table 7b and successively sends them to the subscriber 1.

(3) Sequential retrieval dialing service

When the subscriber of the telephone set 2 dials the PTN of a receiving subscriber (the subscriber of the telephone set 1) using the normal UPT service and the subscriber of the telephone set 1 does not answer in a predetermined time period the call received through the exchange control portion 3 and the service control portion 4, the sequential retrieval dialing service control means 6c is activated. In the sequential retrieval dialing table 7c used for this service, a plurality of DNs registered by the subscriber of the PTN have been stored.

The sequential retrieval dialing service control portion 6c of the service control portion 4 retrieves the DN listed at the top of the sequential retrieval dialing table 7c and sends this DN to the exchange control portion 3 along with a connection command. Then, the exchange control portion 3 connects the telephone set 2 of the subscriber to the telephone set with this DN and calls it. When the telephone set with the DN does not answer, the sequential retrieval dialing service control portion 6c retrieves the DN listed at the second from the top of the sequential retrieval dialing table 7c and sends this DN to the exchange control portion 3 along with a connection command. These processes are repeated until the sequential retrieval dialing service control portion 6c finds a telephone set which answers.

(4) Personal telephone directory service

When the subscriber of the telephone set 1 inputs his PTN for the UPT service and then dials the PTN or DN of a receiving subscriber, the telephone directory service control means 6d of the service control portion 4 not only commands the exchange control portion 3 to connect the telephone set 1 to the corresponding telephone set, but also records the DN data in the telephone directory table 7d which is provided for each PTN. In other words, the telephone directory service control means 6d records the PTN or DN, the name thereof, and so forth of each call made by a sending subscriber in the telephone directory table 7d. This telephone directory table 7d works as a telephone directory for the PTN of each sending subscriber. Whenever a sending subscriber makes a call to a receiving subscriber, the cumulative number of calls to the receiving subscriber recorded in the telephone directory table 7d is incremented.

When a subscriber dials a special number for the telephone directory service and inputs his PTN to reference his telephone directory, the telephone directory service control means 6d is activated and thereby the subscriber can retrieve the content of the telephone directory table 7d. In this case, when the telephone set of the subscriber is of a digital telephone type with a display function, the service control portion 4 sends each access (call) data recorded in the telephone directory table 7d to the telephone set 1 one at a time. Thus, each access data is displayed on the telephone set 1 of the subscriber. When the telephone set 1 of the subscriber is of a non-digital type, he can listen to each of the access data.

After receiving access data stored in the telephone directory table 7d, when the subscriber finds a receiving subscriber to call (by identifying the name, PTN, or DN) and sends a particular signal from the telephone set 1, the service control portion 4 detects this signal and sends a connection command to the exchange control portion 3 using the PTN or DN of the subscriber. As a result, the telephone set 1 of the subscriber is connected to the designated subscriber.

Figure 2:
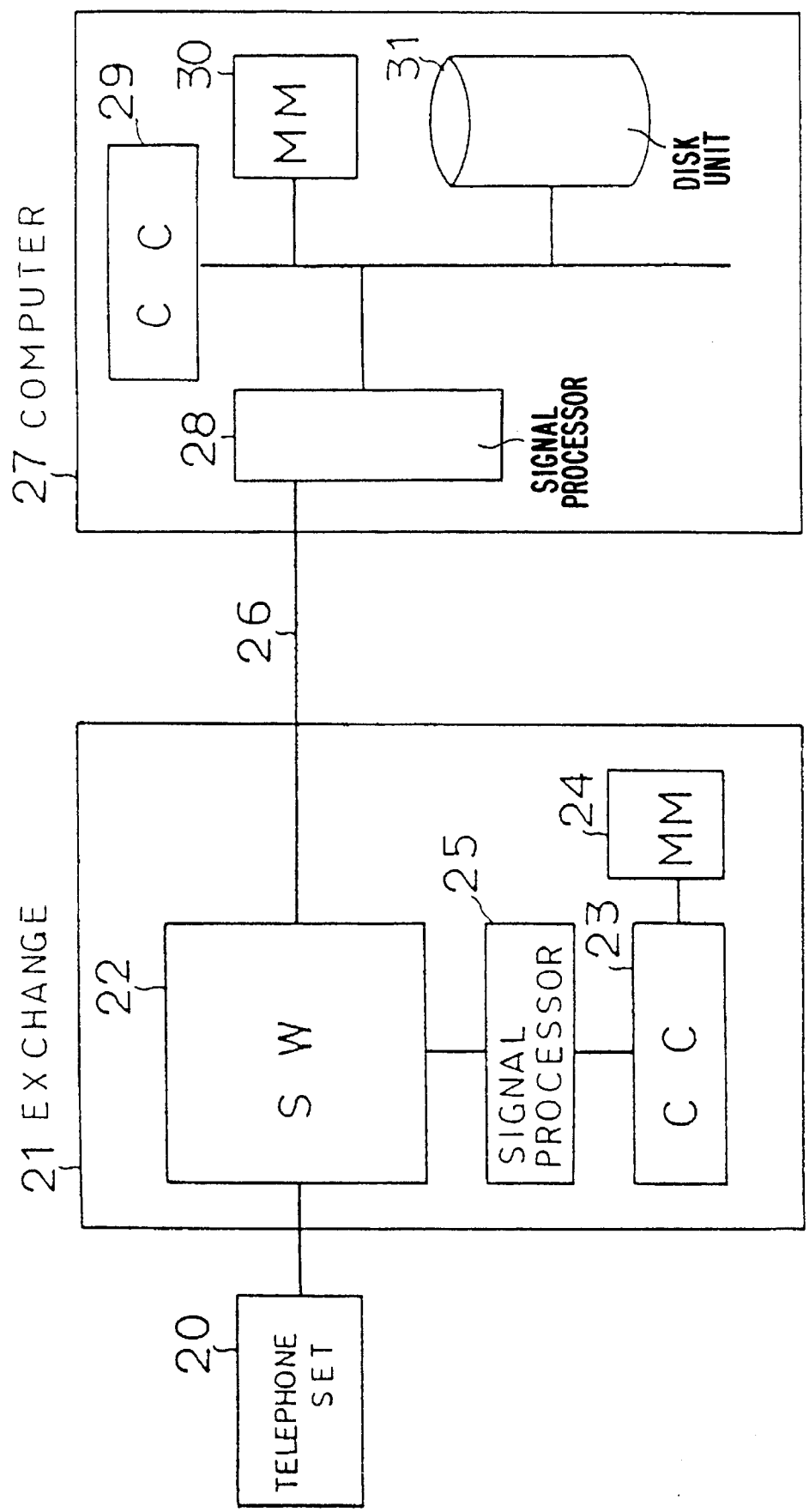
FIG. 2 is a block diagram showing the construction of a system in accordance with the present invention.
Figure 3:
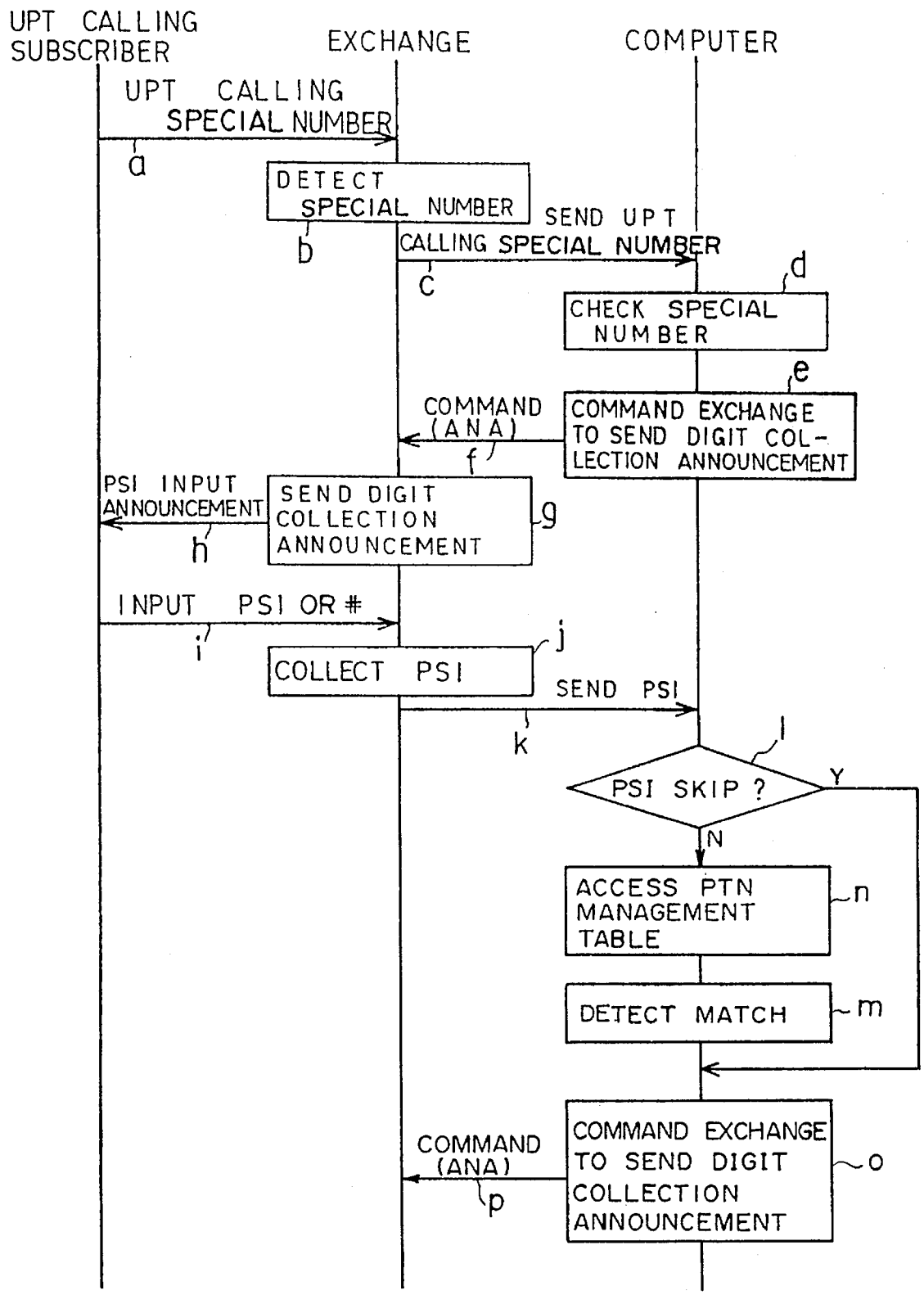
FIG. 3 is a flowchart showing the first half of the sequence of a calling and basic connecting process of an embodiment.
Figure 4:
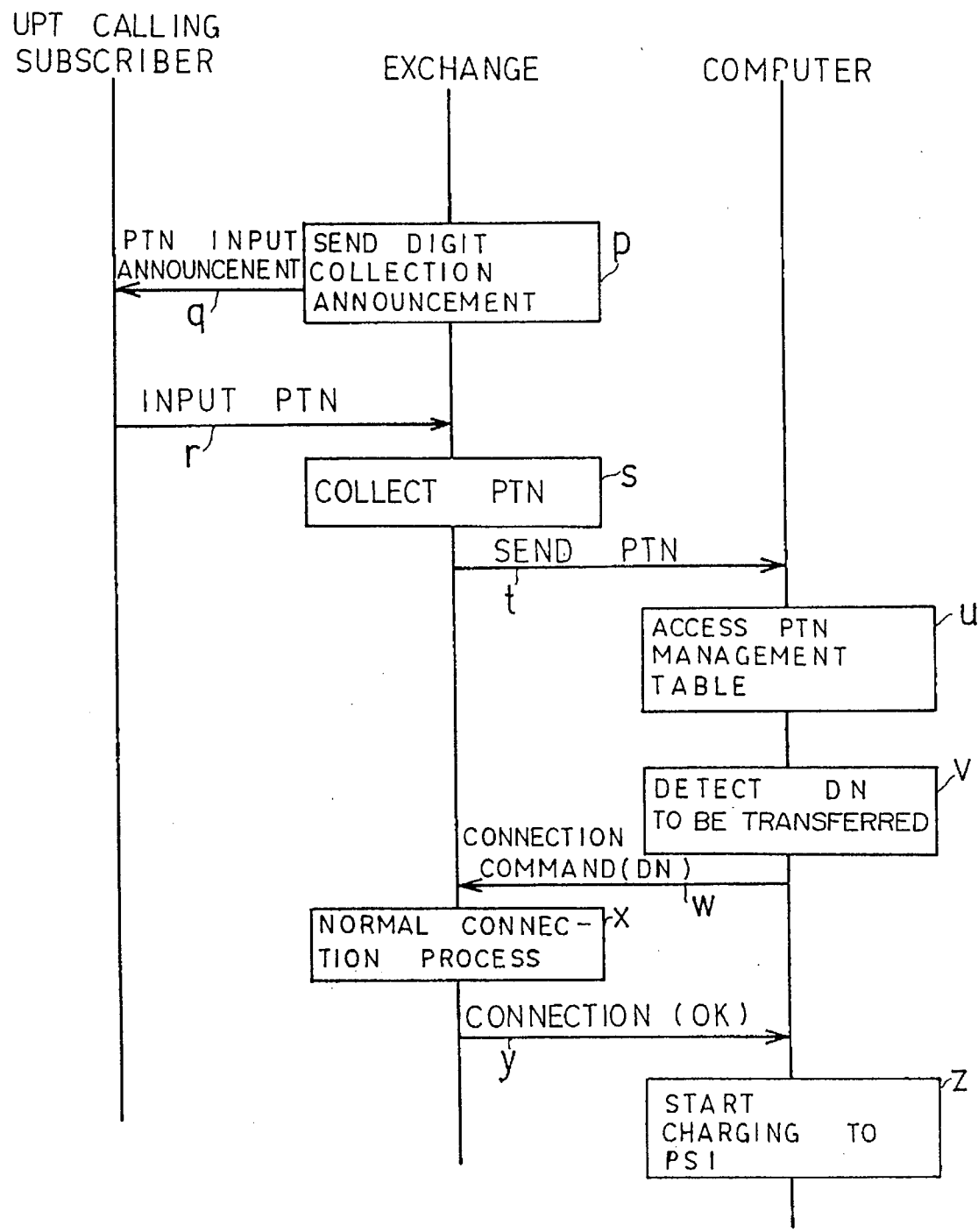
FIG. 4 is a flowchart showing the second half of the sequence of FIG. 3.
Figure 5A:
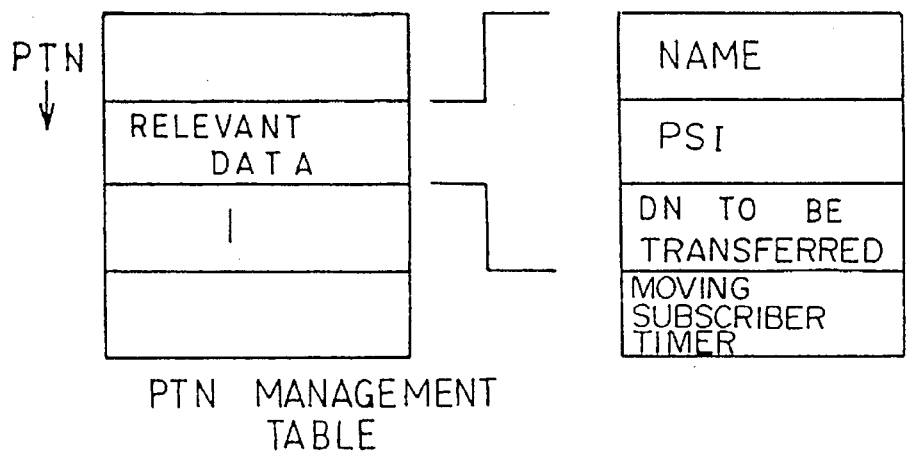
FIG. 5 (A) is a schematic diagram for explaining a PTN management table stored in a database.
Figure 5B:
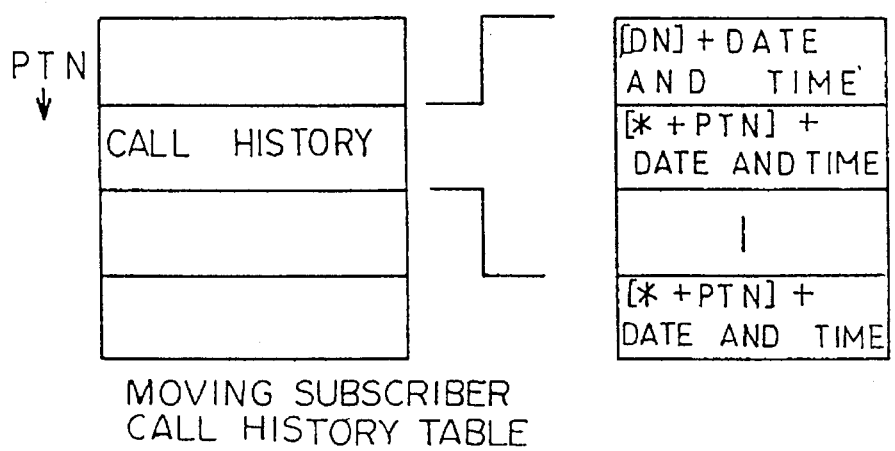
Figure 5C:
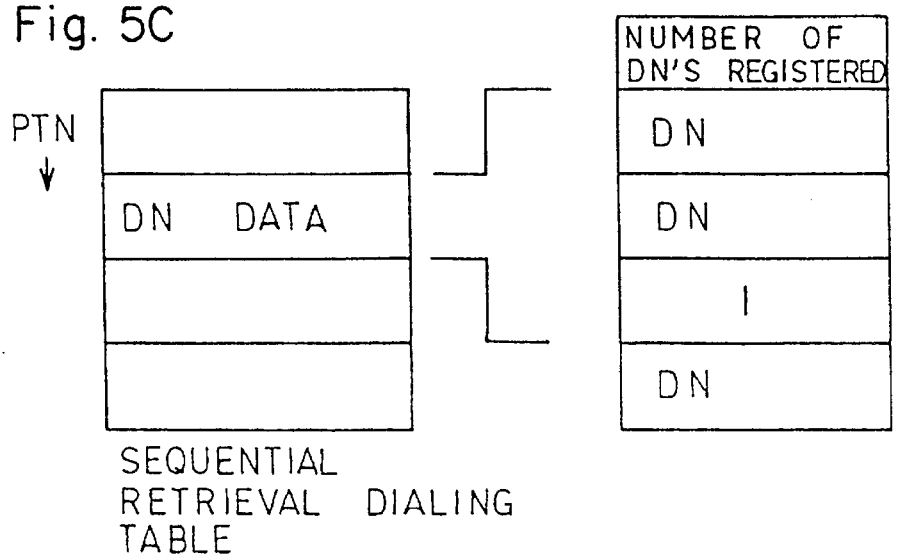

FIG. 2 is a block diagram showing the construction of a system in accordance with the present invention. FIG. 3 is a flowchart showing the first half of the sequence of a calling and basic connecting process in accordance with an embodiment. FIG. 4 is a flowchart showing the second half of FIG. 3. FIG. 5 (A) is a schematic diagram for explaining a PTN management table stored in a database. FIG. 5 (B) is a schematic diagram for explaining a moving subscriber call history table stored in the database. FIG. 5 (C) is a schematic diagram for explaining a sequential retrieval dialing table stored in the database. FIG. 6 is a schematic diagram for explaining a telephone directory table.

In FIG. 2, reference numeral 20 is a telephone set used for each of many subscribers. Reference numeral 21 is an exchange (corresponding to the exchange control portion 3 shown in FIG. 1). The exchange 21 constructs an SSP (Service Switching Point) in an IN (Intelligent Network). Reference numeral 26 is a communication path. Reference numeral 27 is a computer (corresponding to the service control portion 4) connected to the telephone set 20 through the exchange 21 and the communication path 26, for controlling UPT services. The computer 27 constructs an SCP (Service Control Point) in the IN. The communication path 26 for connecting the exchange 21 and the computer 27 is constructed of a high speed line according to X.25 protocol (packet), Ethernet, or FDDI (Fiber Distributed Digital Interface) which uses an optical fiber cable and a high speed bus interface. By placing UPT application data over such lower layers, the processes are accomplished.

The exchange 21 comprises a switching portion 22 (abbreviated as SW), a processor 23 (abbreviated as CC), a memory 24 (abbreviated as MM), and a signal processor 25. The CC 23 executes such processes as switching requests of subscribers, detecting requests of UPT services and sending relevant information to the computer 27, and executing commands received from the computer 27. The MM 24 stores programs and various data for use in controlling switching functions and detecting special numbers for UPT services. The signal processor 25 interfaces with both the switching portion 22 and the computer 27.

The computer 27 comprises a signal processor 28, a processor 29 (abbreviated as CC), a memory 30 (abbreviated as MM), and a disk unit 31. The signal processor 28 inter-works with the exchange 21 and controls protocols thereof. The CC 29 performs processes for executing UPT services. The MM 30 stores programs for controlling UPT services. The disk unit 31 stores a large capacity database relevant to the UPT services. The disk unit 31 preferably uses a RAM disk unit which can be accessed at high speed.

FIGS. 3 and 4 are flowcharts showing the sequence of a calling and basic connecting process for use in the UPT services accomplished by the above-mentioned system. With reference to these figures, this sequence will be described. In FIG. 3, when a sending subscriber who wants to have a UPT service sends a special number for the UPT calling service to the exchange 21 through the telephone set 20 (see FIG. 3, step (a)), the exchange 21 receives this special number and then detects the service type of the special number (see FIG. 3, step (b)). After the exchange 21 detects the service type, it sends the special number for the UPT calling service to the computer 27 (see FIG. 3, step (c)). When the computer 27 receives the special number, it checks the special number (see FIG. 3, step (d)). After the computer 27 determines that the received number is the special number for the UPT calling service, it commands the exchange 21 to send a digit collection announcement (see FIG. 3, step (e)). In other words, the computer 27 sends to the exchange 21 a "Collect Digits (ANA)" signal which commands the exchange 21 to collect a PTN (see FIG. 3, step (f)). (In the figures, this step is represented simply by "Command (ANA).")

When the exchange 21 receives this signal, an announcement unit of the exchange 21 (not shown in FIG. 2) sends an announcement "Dial your PSI. Otherwise, dial #." to the telephone set 20 of the sending subscriber (see FIG. 3, steps (g) and (h)). The PSI stands for Personal Subscriber Identification and is composed of a PTN (Personal Telecommunication Number) and a password added thereafter.

When the subscriber of the telephone set 20 inputs his PSI according to the announcement (see FIG. 3, step (i)), the exchange 21 collects digits of each number of the PSI (PTN+password) (see FIG. 3, step (j)) and sends the PSI to the computer 27 as an answer signal (see FIG. 3, step (k)). When the computer 27 receives the PSI, it accesses the PTN management table (see FIG. 3, step (m)) and compares the password of the PSI with a password registered in the area corresponding to the PTN of the subscriber, of the PTN management table (see FIG. 3, step (n)). When these passwords match, the connection charge for a call that follows is charged to the sending subscriber, not his telephone set. Thus, even if a subscriber does not have a lot of change or a prepaid card, he can make international calls as well as local calls.

When the subscriber of the telephone set 20 inputs a "#" rather than his PSI, the process for checking the PSI is skipped (see FIG. 3, step (l)).

The composition of each of various tables for use in the UPT services in accordance with the present invention is shown in FIGS. 5 and 6. These tables are stored in the disk unit 31 of the computer 27. An example of the PTN management table is shown in FIG. 5 (A). In the area corresponding to each PTN, such data as "name" (for example, person name, or company name), "PSI", and "DN to be transferred" are stored. The "DN to be transferred" is followed by "moving timer", which will be described later.

Returning to FIG. 3, the remaining steps of the sequence will be described. When the PSI received from the subscriber is compared with the password of the PTN registered in the PTN management table or when the checking of the PSI is skipped, the computer 27 commands the exchange 21 to send an announcement for collecting digits to the sending subscriber (see FIG. 3, steps (n) and (o)).

Thereafter, the sequence continues to steps shown in FIG. 4. When the exchange 21 receives the command, it sends an announcement "Dial the DN of the receiving subscriber. Otherwise, dial a "*" and the PTN of the receiving subscriber." to the subscriber of the telephone set 20 (see FIG. 4, steps (p) and (q)). Thereafter, the subscriber of the telephone set 20 dials the DN (directory number) of the receiving subscriber or a "*" followed by the PTN of the receiving subscriber (see FIG. 4, step (r)). The number being dialed is collected by the exchange 21. The exchange 21 sends the collected number to the computer 27 as an answer signal (see FIG. 4, steps (s) and (t)). When the computer 27 receives the PTN of the receiving subscriber, it accesses the PTN management table as shown in FIG. 5 (A) (see FIG. 4, step (u)). By retrieving the "DN to be transferred", the computer 27 obtains the DN of the receiving subscriber with the PTN (see FIG. 4, step (v)). On the other hand, when the subscriber of the telephone set 20 dials the DN of the receiving subscriber, the computer 27 does not convert the PTN of the receiving subscriber into his DN.

When the computer 27 obtains the DN of the receiving subscriber, it sends a connection command along with the DN to the exchange 21 (see FIG. 4, step (w)). When the exchange 21 receives this command and the DN, it performs a normal connection process (see FIG. 4, step (x)). Realistically, the signal processor 25 shown in FIG. 2 connects the sending subscriber and the receiving subscriber by using the information of the telephone set 20 of the sending subscriber and the DN of the receiving subscriber received from the computer 27. The switching portion 22 is switched by the signal processor 25 so as to form a communication path between these subscribers (step y).

In the above sequence, when the sending subscriber wants to have a service where the connection charge is charged to his PTN of his PSI (step z) without necessity of the PTN calling service, the sending subscriber will dial his PSI in accordance with the PSI input announcement (see FIG. 4, step (q)) and then dial the DN of the receiving subscriber in accordance with the receiving subscriber PTN input announcement (see FIG. 4, step (q)).

Next, with reference to FIGS. 7 to 9, the process sequence of a moving subscriber announcement service will be described.

With the moving subscriber announcement service, a subscriber can change his DN or register a DN to be transferred along with a timer (date and time) which validates the change and transfer when he goes to a different site. Thus, when a subscriber uses this service, even if other subscribers call him while he is changing locations, they can have the announcement "This subscriber is now going to another location."

Figure 7:
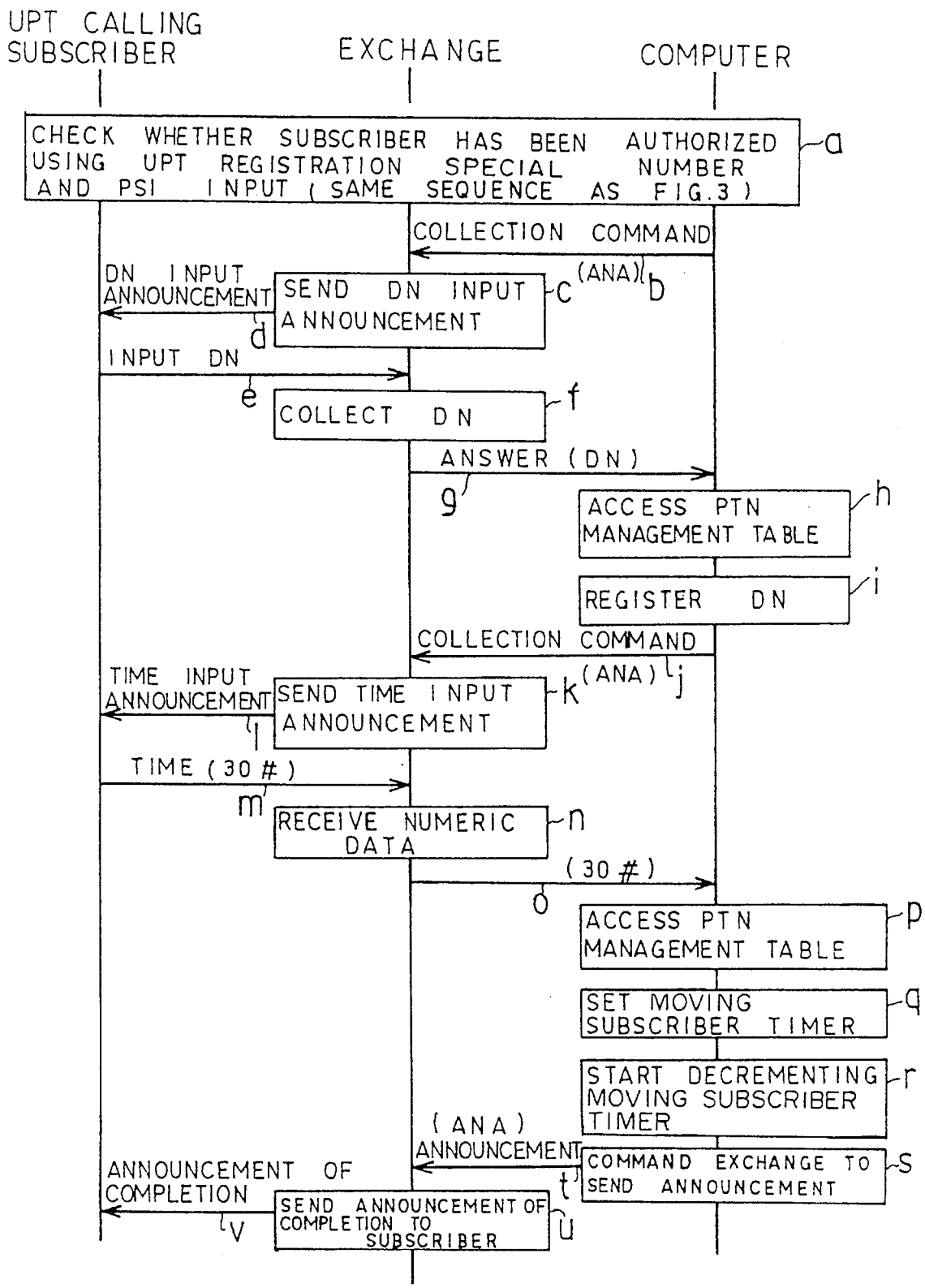
FIG. 7 is a flowchart showing the sequence of a moving subscriber announcement service registration process.

FIG. 7 is a flowchart showing the sequence of a moving subscriber announcement service registration process.

In the sequence of the figure, when a UPT calling subscriber who wants to have the moving subscriber announcement service send a special number for the UPT registration service to the exchange, an operation similar to that of FIG. 3 is performed (see FIG. 7, step (a)). In other words, when the computer receives the special number for the UPT registration service through the exchange, it starts the registration process. In other words, the computer receives the PSI from the subscriber and then determines whether or not the subscriber has been authorized for the UPT service. When the subscriber has been authorized, the computer commands the exchange to send a DN input announcement to the subscriber (see FIG. 7, step (b)). Thus, the exchange sends this announcement to the subscriber (see FIG. 7, steps (c) and (d)). When the subscriber inputs a DN to be transferred, the exchange collects the number and sends it to the computer as an answer (FIG. 7, steps (e) to (g)).

Then, the computer accesses the PTN management table (see FIG. 5 (A) and FIG. 7, step (h)) and registers the DN received as data of the DN to be transferred in the area corresponding to the PTN (contained in the PSI received in the step (a) of FIG. 7) of the subscriber (the DN according to the former PTN is changed) (see FIG. 7, step (i)).

After the computer completes the change of the DN, it commands the exchange to send a time input announcement (see FIG. 7, step (j)). The exchange sends an announcement such as "From what time do you want to validate the transferring of calls" (see FIG. 7, steps (k) and (l)). When the subscriber inputs a time (date and time) for which it takes for him to arrive at a desired site, the exchange receives numeric data (see FIG. 7, steps (m) and (n)). In the example shown in FIG. 7, "30#" representing the time of 30 minutes is inputted. When the subscriber wants the exchange to transfer, i.e. forward, calls immediately, he will input for example a "#" only.

When the exchange sends information representing the time to the computer (see FIG. 7, step (o)), the computer accesses the PTN management table and registers the received time therein as a subscriber location-changing timer (see FIG. 5, (A) and FIG. 7, steps (p) and (q)). When the subscriber location-changing timer is set, the computer starts decrementing the value of the subscriber location-changing timer (by −1) at predetermined intervals (see FIG. 7, step (r)). When this decremental operation is started, a flag (not shown in the figures) representing the state of the subscriber location-changing timer is turned on. When the value of the timer exceeds a predetermined value, the flag is turned off. When the computer sends to the exchange an announcement representing that the registration is completed (see FIG. 7, steps (s) and (t)), the exchange sends the announcement to the subscriber (see FIG. 7, steps (u) and (v)). An example of the announcement is such that "The UPT number has been changed."

Figure 8:
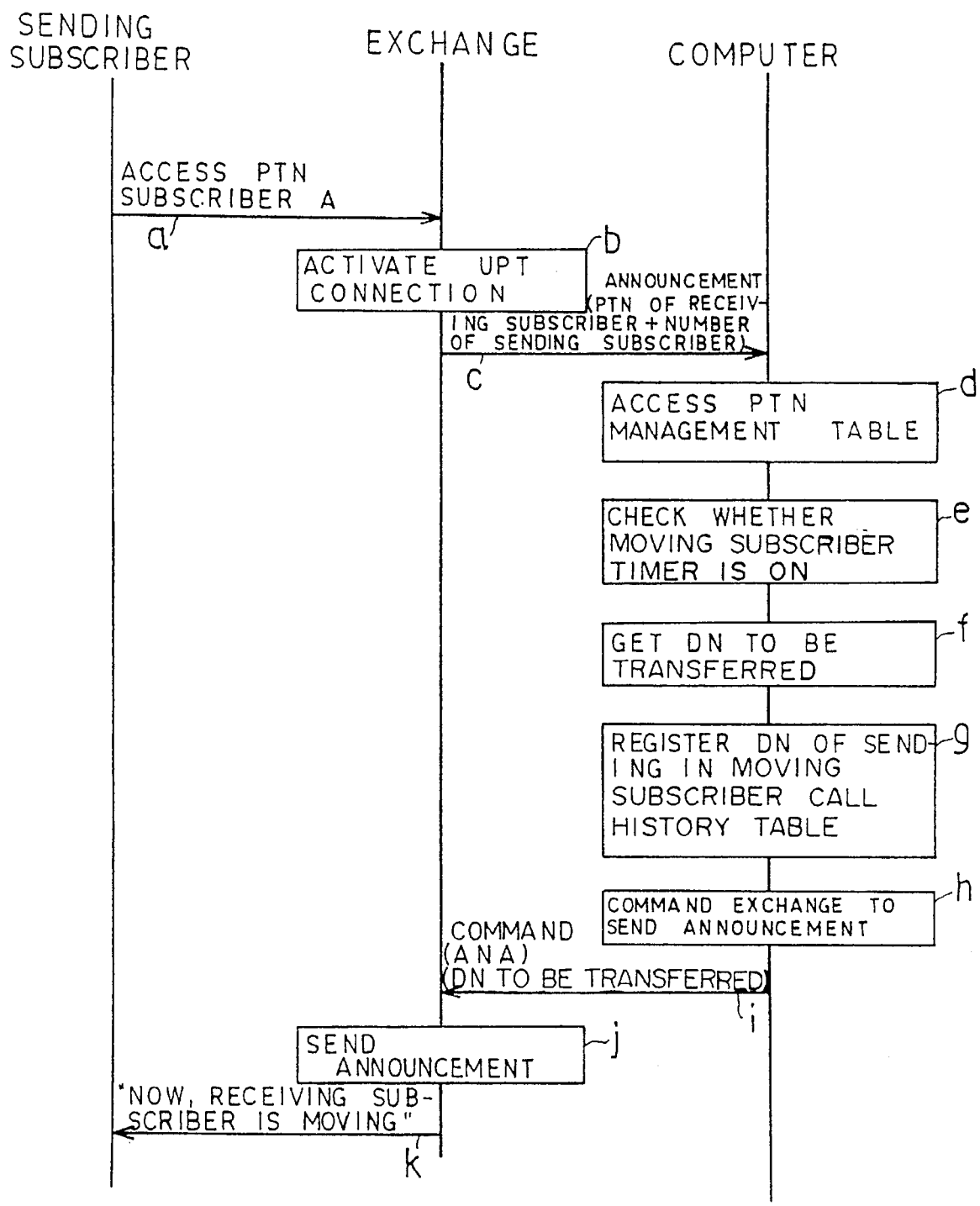
FIG. 8 is a flowchart showing the sequence of a moving subscriber access process.

After the subscriber is registered for the location-changing subscriber announcement service, the sequence of a location-changing subscriber access process shown in FIG. 8 is executed.

In other words, when a subscriber calls another subscriber whose PTN has been registered for the location-changing subscriber access service (hereinafter the latter subscriber is referred to as the PTN subscriber A) (see FIG. 8, step (a)), the exchange identifies the PTN as one registered for the UPT service and sends the PTN and the DN of the sending subscriber to the computer (see FIG. 8, steps (b) and (c)). Since the DN of the sending subscriber is detected by a conventional exchange (for example, an ISDN exchange) or contained in the call setting information sent from the sending subscriber, it is known.

Thus, the computer accesses the PTN management table (FIG. 5 (A)) and determines whether or not the flag of the subscriber moving timer is turned on (FIG. 8, steps (d) and (e)). When the flag is turned on, the computer knows that the subscriber is changing locations and retrieves the DN to be transferred from the PTN management table for use in the process that follows (see FIG. 8, step (f)). Thereafter, the computer registers the PTN of the sending subscriber and the time in a moving subscriber call history table used for the moving subscriber announcement process (see FIG. 8, step (g)).

The moving subscriber call history table is shown in FIG. 5 (B). This table sequentially stores information of all calls received while a subscriber registered for the moving subscriber announcement service is changing locations. In the area according to the subscriber registered for this service, "DN and time" or "[*+PTN]+time" of the sending subscriber of each call received while the receiving subscriber is changing locations are stored in the order of occurrence.

Returning to FIG. 8, the remaining steps of the sequence will be described. After relevant information is registered in the table, the computer sends an announcement to the exchange. At this point, the computer also sends to the exchange the DN to be transferred, which is obtained in the step (f) of FIG. 8 (see FIG. 8, steps (h) and (i)). Thus, the exchange sends to a sending subscriber an announcement such as "I am now moving to DN (OO . . . O). As soon as I arrive, I will call you back." (see FIG. 8, steps (j) and (k)).

Figure 9:
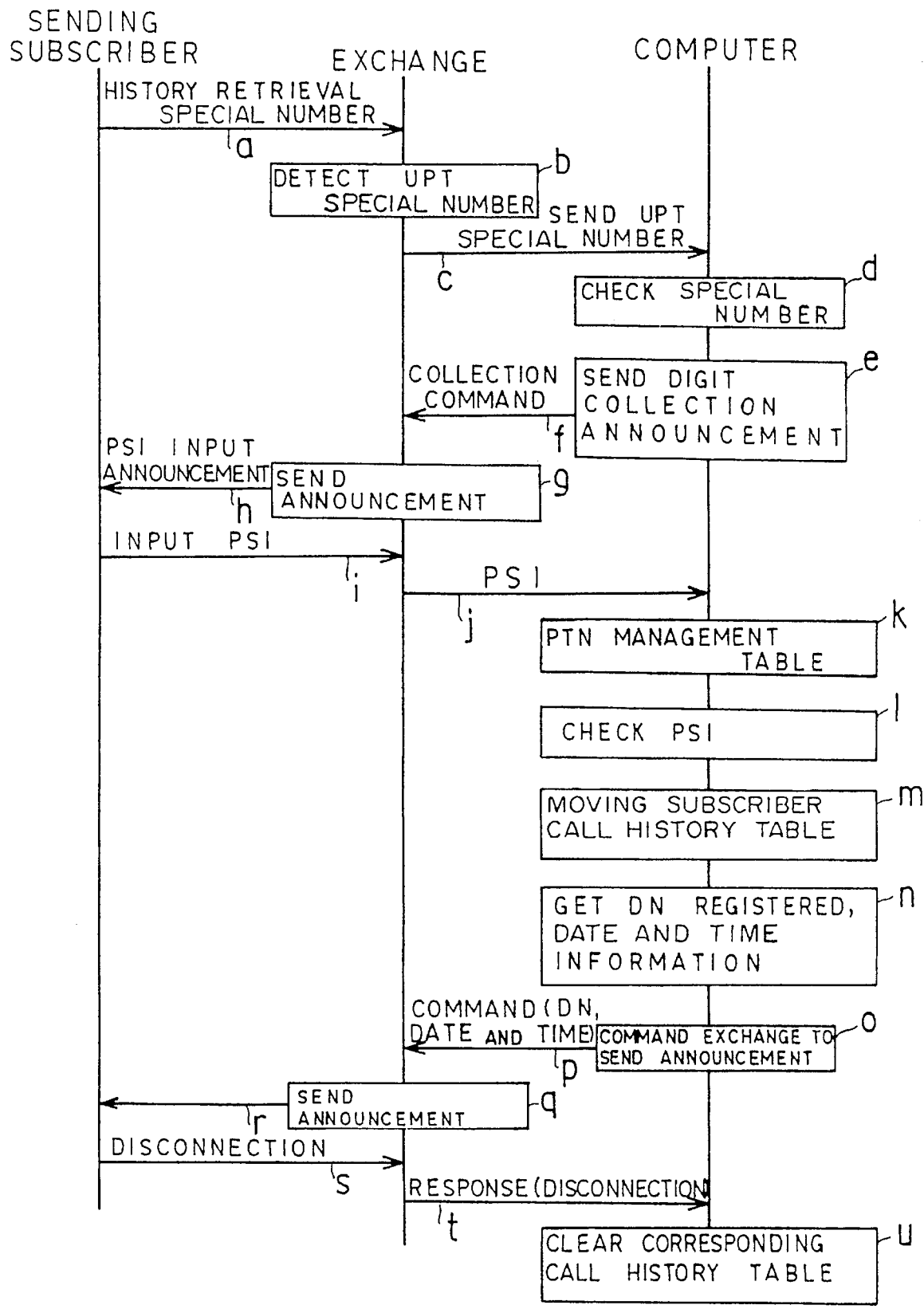
FIG. 9 is a flowchart showing the sequence of a history access retrieval process.

FIG. 9 shows the sequence of a history access retrieval process. With this process, after a subscriber registered for the moving subscriber announcement service arrives at a desired site, he can know the history of calls received and addressed to him while he was in transit.

When a subscriber dials a special number for the history access service (FIG. 9, step (a)), the exchange detects the special number for the service and sends it to the computer (see FIG. 9, steps (b) and (c)).

After the computer checks the special number and identifies it as the call history retrieval access service (FIG. 9, step (d)), it sends a digit collection announcement to the exchange (see FIG. 9, steps (e) and (f)). Thus, in the same manner as the above-mentioned process sequence (see FIG. 3), the computer sends a PSI input announcement to the exchange and checks the received PSI by using the PTN management table so that the exchange can identify the subscriber (see FIG. 9, step (g) to (l)). After the computer identifies the subscriber, it accesses the moving subscriber call history table (see FIG. 5 (B)) and retrieves numbers (DNs and PTNs) and the time information stored in the area of the subscriber (PTN) as the call history (see FIG. 9, steps (m) and (n)). The computer sends the retrieved content and an announcement command to the exchange (see FIG. 9, steps (o) and (p)).

Then, the exchange announces the numbers and the time information to the subscriber (see FIG. 9, steps (q) and (r)). An example of the announcement is such that "The following users called you. Please call them back."

1) 3: 43, January 1, PTN 7771111 <Pause>

2) 3: 50, January 1, DN 7122222 <Pause>

3) 3: 55, January 1, PTN 7773333

The announcement will be repeated until the subscriber disconnects the line. When flashing is make from the subscriber during Pause interval, a call to the announced PTN or DN will be automatically made. When the sending subscriber disconnects the line (see FIG. 9, step (s)), the exchange detects this disconnection and sends the relevant signal to the computer. Then, the computer clears (erases) the content stored in the area of the relevant PTN of the moving subscriber call history table (see FIG. 9, steps (t) and (u)).

Next, with reference to FIG. 10, the sequence of a sequential retrieval dialing process will be described. In the sequential retrieval dialing process, when a subscriber calls another subscriber registered for the PTN calling service, if the receiving subscriber does not answer due to absence or the like, DNs (telephone sets) which have been registered are automatically dialed one after the other. An example of the case that a receiving subscriber is absent includes the case that the subscriber who is in transit to a different site forgot to register a DN to be transferred for the moving subscriber announcement service (see FIG. 7).

Figure 10:
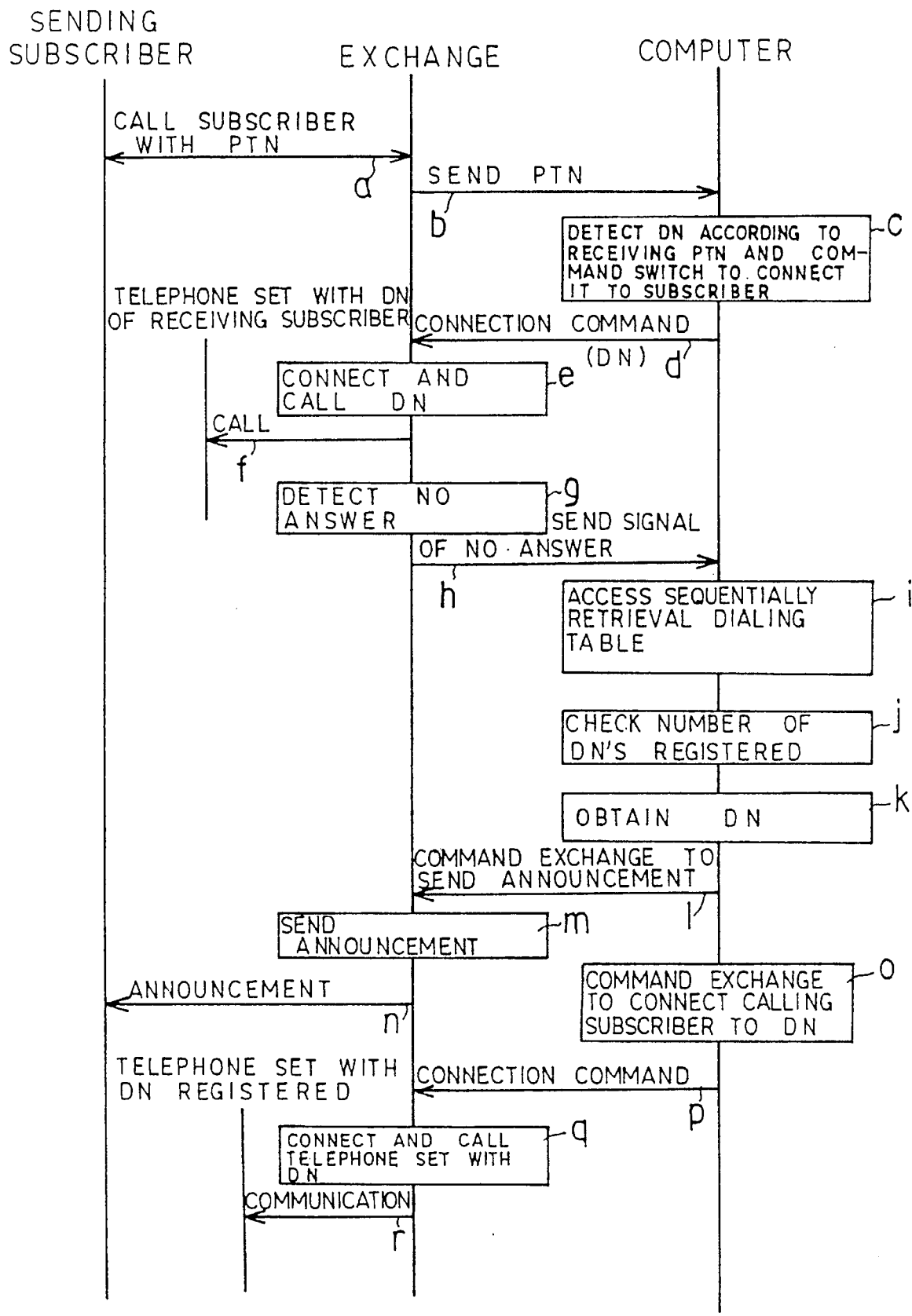
FIG. 10 is a flowchart showing the sequence of a sequential retrieval dialing process.

In FIG. 10, when a subscriber calls another subscriber by using the PTN of the receiving subscriber and the PTN is sent to the computer through the exchange, the computer retrieves the DN according to the PTN of the receiving subscriber from the PTN management table (see FIG. 5 (A)) and sends a connection command with the DN to the exchange (see FIG. 10, steps (a) to (d)). When the exchange connects the sending subscriber to the receiving subscriber with the DN, if it cannot receive an answer from the receiving subscriber in a predetermined time period, the exchange sends a signal representing no answer from the receiving subscriber to the computer (see FIG. 10, steps (e) to (h)). When the computer receives this signal, it accesses the sequential retrieval dialing table (see FIG. 10, step (i)).

An example of the sequential retrieval dialing table is shown in FIG. 5 (C). In this table, a plurality of DNs have been registered for the sequential retrieval dialing service in accordance with a registration process sequence (see FIG. 11), which will be described later. In the table, the number of DNs registered and DN data are stored.

Returning to FIG. 10, the remaining steps of the sequence will be described. The computer checks the number of DNs registered in the area according to the relevant PTN of the table (see FIG. 10, step (j)) and retrieves the DN at the top of the table (see FIG. 10, step (k)). When the computer sends an announcement command for the DN retrieved to the exchange, the exchange sends the announcement to the sending subscriber (see FIG. 10, steps (l) to (n)). An example of an announcement is: "No answer. The user will be located. The next access DN, 7122234 will be called." When the telephone set of the sending subscriber is an ISDN type, it can display the next access DN in the format of a digital signal rather than an vocal announcement received from the exchange. In addition, along with the access DN, the name according to the PTN (obtained by using the PTN management table) can be displayed.

When the computer sends a connection command with the DN to the exchange (see FIG. 10, steps (o) and (p)), the exchange attempts to connect and call the DN (see FIG. 10, steps (q) and (r)). When the receiving subscriber answers the call, the exchange forms a communication path between the sending subscriber and the receiving subscriber and connects them. After the call is finished, when the sending subscriber makes flashing (not shown in the figure), the exchange detects the relevant flashing signal and sends it to the computer.

Whenever receiving the flashing signal, the computer retrieves the next DN from the sequential retrieval dialing table and repeats the steps (k) to (r) of the process sequence. This process is repeated until the sending subscriber stops the request (hooks on) or until all the DNs registered for the PTN in the sequential retrieval dialing table (see FIG. 5 (C)) are dialed.

Next, with reference to FIG. 11, the sequence for a sequential retrieval dialing table registration process will be described. This process is executed when a sending subscriber performs a registration, change, or deletion of a DN in the sequential retrieval dialing table (see FIG. 5 (C)). In the example shown in FIG. 11, a registration of a DN will be described.

Figure 11:
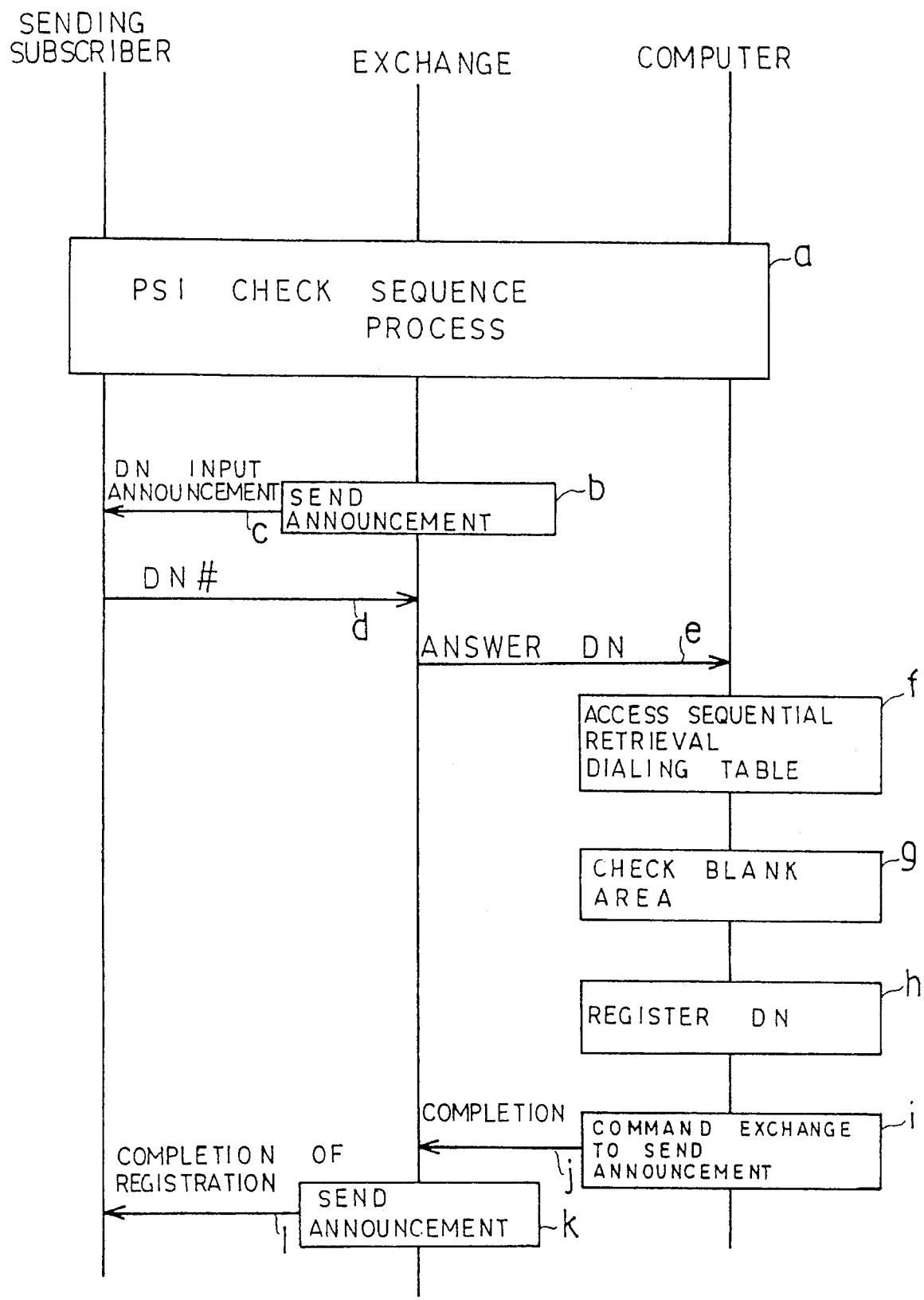
FIG. 11 is a flowchart showing the sequence of a sequential retrieval dialing table registration process.

When a subscriber dials a special number for the sequential retrieval dialing table registration service, a PSI check sequence similar to those shown in FIGS. 3 and 7 step (a) is executed by mutual operation of the computer, exchange, and input of the subscriber (see FIG. 11, step (a)). After the computer checks the PSI of the subscriber, it sends a DN input announcement (see FIG. 11, steps (b) and (c)). An example of the announcement is: "Input a DN to be registered. When finished, input a "#"." When the sending subscriber inputs "DN#" (see FIG. 11, step (d)), the exchange detects this data and sends it to the computer (see FIG. 11, step (e)). Then, the computer accesses the sequential retrieval dialing table (see FIG. 11, step (f)) and determines whether or not the area of the sending subscriber (PTN) has a space. When the area has a space, the computer registers the received DN in the table (see FIG. 11, steps (g) and (h)).

After the computer completes the registration, it commands the exchange to send an announcement representing that the registration is completed. Thus, the exchange sends the announcement to the sending subscriber. As a result, the registration of the DN is completed (see FIG. 11, steps (i) to (l)).

To change a DN registered in the sequential retrieval dialing table, a subscriber will input an old DN and a new DN in accordance with a request issued by the computer. When the subscriber wants to delete all or one of the DNs, he will input a corresponding code.

Next, with reference to FIGS. 12 to 15, the process flow of a personal telephone directory service will be described.

Figure 12:
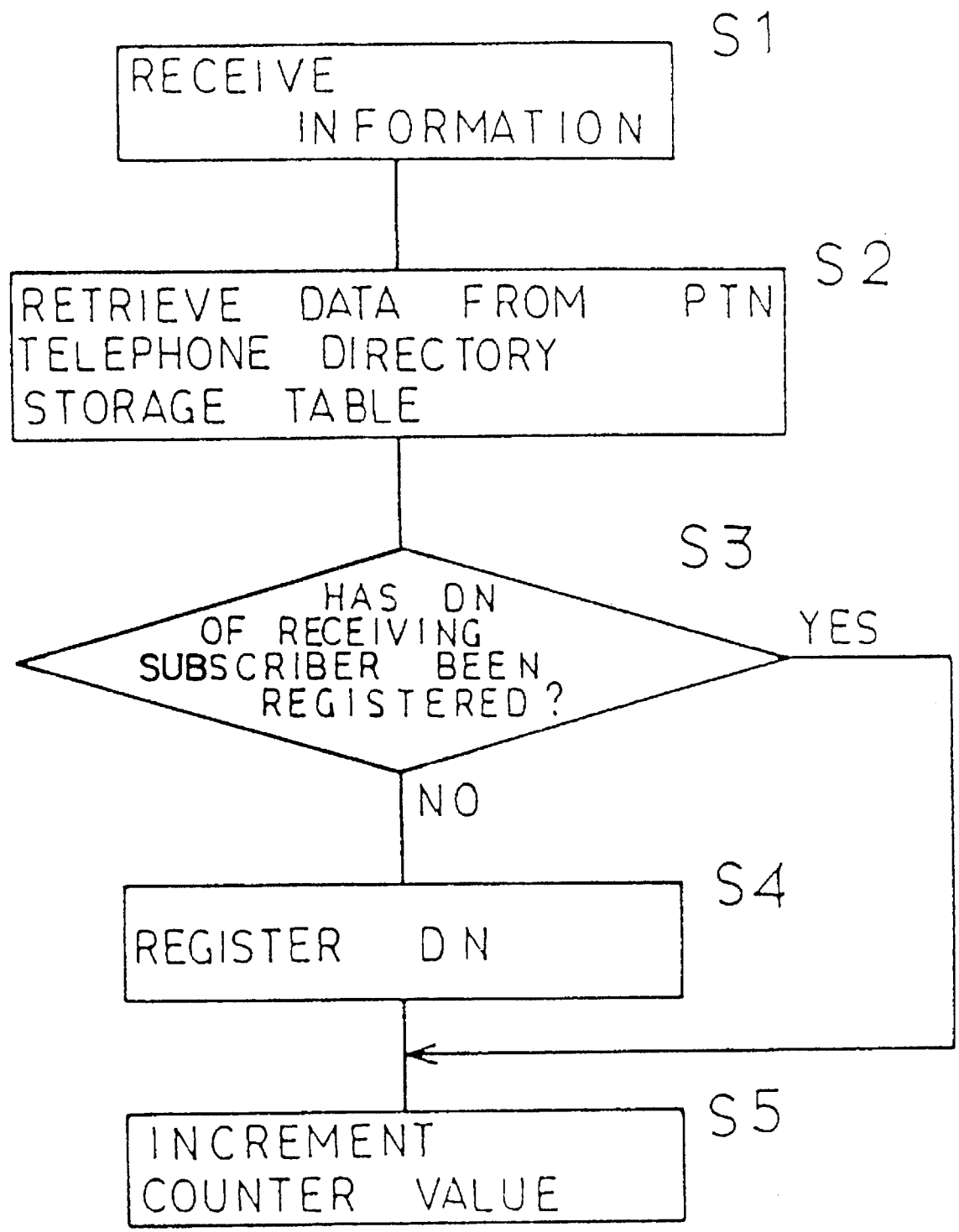
FIG. 12 is a flowchart of a personal telephone directory registration process.

FIG. 12 is a flowchart of a personal telephone directory registration process. When a subscriber registered for the personal telephone directory service makes a call, the exchange performs the normal connecting process, obtains information relating to the call, and sends the information to the computer. The computer stores this information. In this case, the information received from the exchange connecting service process is the PTN of the sending subscriber and the PTN or DN of the receiving subscriber.

The composition of the storage table for storing the telephone directory data used for the personal telephone directory service is shown in FIG. 6. The telephone directory data is stored in the area corresponding to the PTN of each subscriber. The area is composed of a storage table A and a storage table B. The storage table A is used for storing and retrieving data, whereas the storage table B is used for storing only. The storage table A and the storage table B are switched with each other at predetermined intervals (for example, every month, every half year, or every year). Each of the storage tables A and B stores the PTN or DN of each receiving subscriber called by the sending subscriber and a call counter c representing the number of calls of each PTN or DN. In the storage table A used for retrieving data, the PTNs or DNs are listed in the descending order (from the largest count value to the smallest count value).

In FIG. 12, when the computer receives information of a call sent from a sending subscriber (PTN) in the connection process (see FIG. 12, S1), it queries the storage tables (A) and (B) of the telephone directory according to the PTN (see FIG. 12, S2). The computer determines whether or not the DN or PTN of a receiving subscriber has been registered in the storage tables (A) and (B) (see FIG. 12, S3). When the DN or PTN of the receiving subscriber has been registered in the storage tables (A) and (B), the computer increments the call counter (by +1) (see FIG. 12, S5). When the DN or PTN of the receiving subscriber has not been registered in the storage tables (A) and (B), the computer makes a registration in the storage tables (A) and (B) the DN or PTN received and the name of the receiving subscriber by using the PTN and increments the call counter (see FIG. 12, S4 and S5).

The process flow of switching the storage tables A and B for storing data of the personal telephone directory is shown in FIG. 13. In other words, a periodic process is executed at predetermined intervals (see FIG. 13, S1) so that the switching pointer of the storage tables (A) and (B) is operated (see FIG. 13, S2). Thus, the storage table (A) is switched to the storage table (B), whereas the storage table (B) is switched to the storage table (A). Then, the content of the storage table which was used for retrieving data and newly became the table (B) is all cleared (FIG. 13, S3). The content of the storage table which was used for storing data and newly became table (A) is sorted in the order of access frequency (according to the call counter) (see FIG. 13, S4). The switching operation between storage table A and storage table B is controlled by a switching pointer section P in which "1" designating the storage table A or "0" designating the storage table B is stored. In an ordinary routine, DN or PTN is received, PTN is converted to DN, and then such a PTN is registered in the storage table B as shown in FIG. 6B. In a retrieving routine, when the PTN is not retrieved, because the PTN is not stored in the storage table A, the line is disconnected, as shown in FIG. 6C. When the PTN is retrieved from the storage table A, it is also registered in the storage table B if it is not yet registered in the storage table B. When the memory capacity of the storage table A for retrieval has room for storing a new PTN, the storage table A may store the new PTN in the same way as the storage table B.

Figure 14:
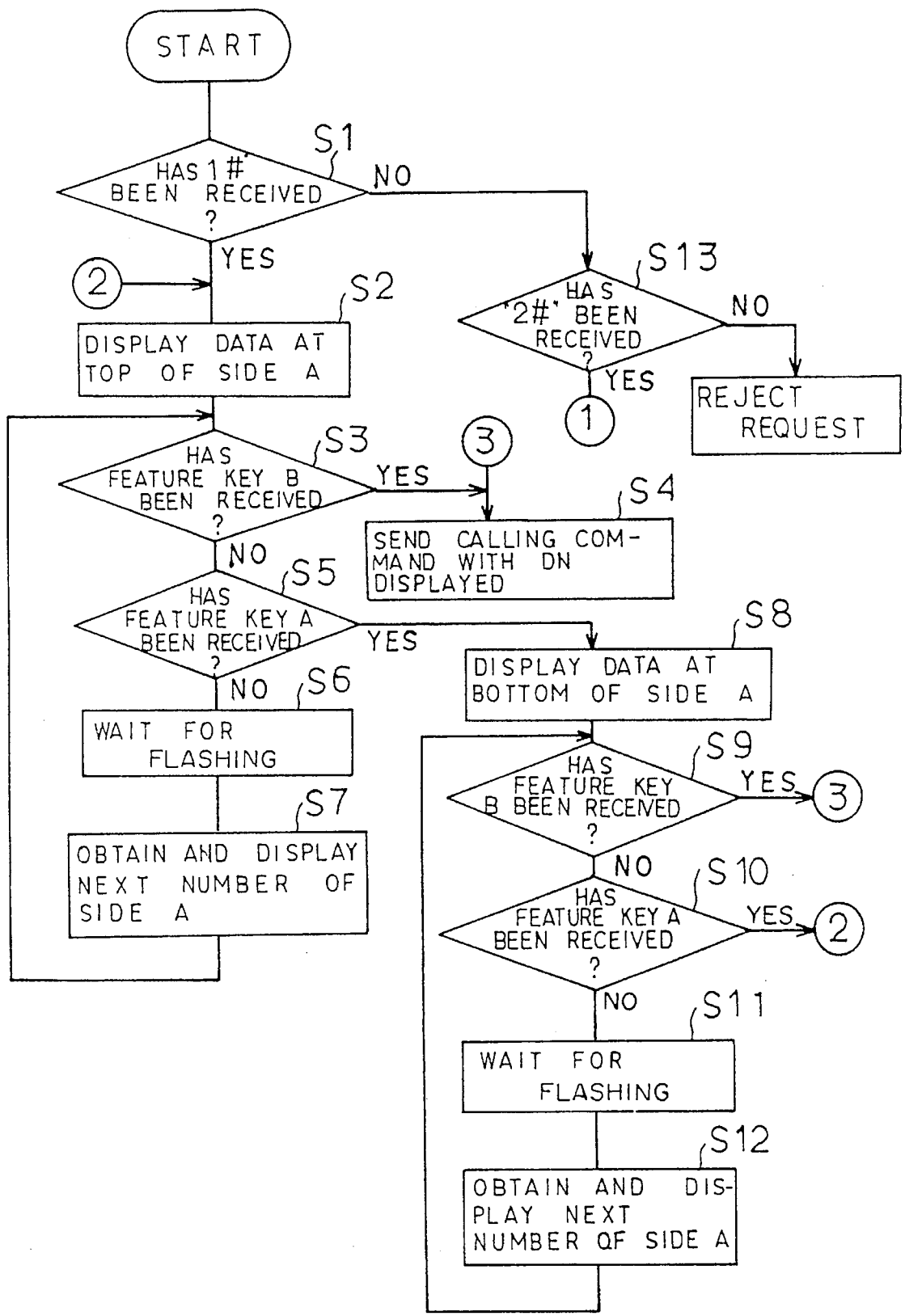
FIG. 14 is a flowchart showing the first half of a telephone directory retrieval process.
Figure 15:
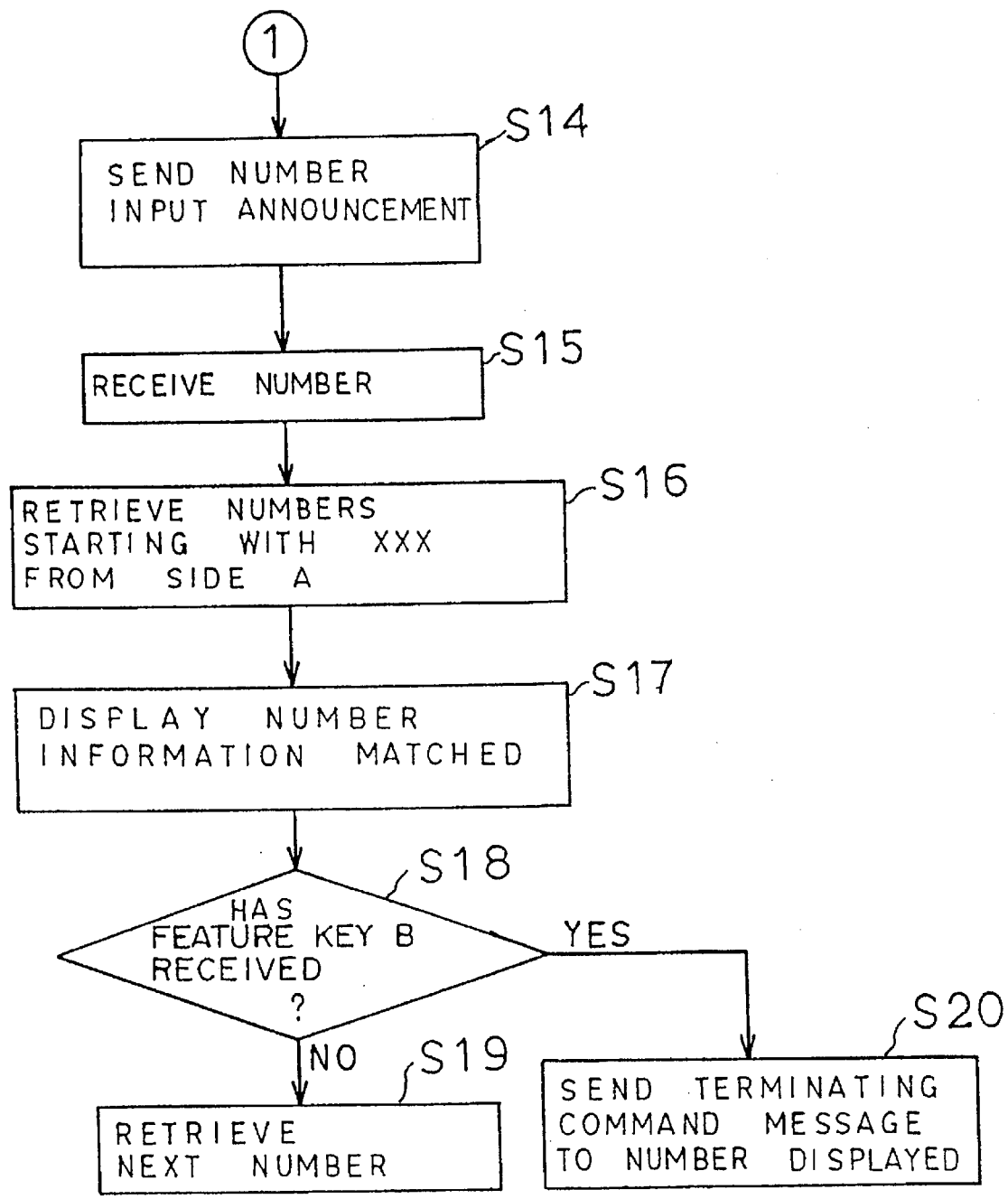
FIG. 15 is a flowchart showing the second half of FIG. 14.

FIGS. 14 and 15 are flowcharts showing the first and second halves of a telephone directory retrieval process, respectively.

When the personal telephone directory is used, one of two retrieval methods can be selected. The first method is a "sequential retrieval" for retrieving data from the telephone directory in the order of call frequency. The second method is a "wildcard number retrieval" for retrieving a desired number by simply inputting a part thereof rather than the entire number (hereinafter, this method is simply referred to as number retrieval). Next, the telephone directory retrieval process will be described.

When a subscriber inputs a special number for the telephone directory service, the special number is sent to the computer through the exchange. Thus, the computer is activated and sends an announcement command to the exchange. The announcement unit of the exchange sends to the sending subscriber a vocal announcement such as "For sequential retrieval, input "1#". For number retrieval, input "2#".

The process that follows is shown in FIGS. 14 and 15. After the process starts, the computer determines whether or not it has received "1#" from the subscriber (see FIG. 14, S1). When the computer has received "1#", it retrieves data (DN and name) at the top of the storage table A of the personal telephone directory and sends the data to the subscriber through the exchange (see FIG. 14, S2). Thus, the data is displayed on the telephone set (not shown) of the subscriber.

An example of a telephone set for the personal telephone directory service is a digital ISDN type. On the display portion of the telephone set, DNs and (their names) are displayed. When the subscriber wants to call another subscriber with the DN and the name displayed, he will operate a feature key B (assigned to one of the function keys of the digital telephone set). When the subscriber does not want to see the next data of the telephone directory, he will make flash. When the subscriber wants to see data of the telephone directory in the reverse order, he will operate a feature key A (assigned to one of the function keys of the digital telephone set).

When the content of the display is a PTN and its name, the following data is displayed.

"7771111" JOHN BROWN

Returning to FIG. 14, the remaining steps of the process will be described. After the computer sends to the subscriber the DN (and its name) at the top of the storage table A, it determines whether or not it has received a signal relevant to the feature key B from the sending subscriber (see FIG. 14, S3). When the computer has received the feature key B, it sends to the exchange a DN calling command (message) (see FIG. 14, S4). When the exchange receives this command, it connects the sending subscriber to the receiving subscriber with the special DN.

When the computer has not received the feature key B, it determines whether it has received the feature key A (see FIG. 14, S5). When the computer has not received the feature key A, it waits until it receives the signal relevant to the flashing signal (see FIG. 14, S6). When the computer receives the flashing signal, it performs the process for retrieving and displaying the next DN (and its name) from the storage table A (see FIG. 14, S7). When the subscriber wants to display data in the reverse order, he will operate the feature key A. At this point, the computer retrieves data at the bottom (last) of the storage table A and sends it to the subscriber (see FIG. 14, S8). Thus, the telephone set of the subscriber displays the data. At S9, the computer determines whether or not it has received the feature key B. When the computer has received the feature key B, it executes each step of S10 to S12 and S9.

When the computer has not received "1#" at the beginning of the process shown in FIG. 14, it determines whether or not it has received "2#" (see FIG. 14, S13). When the computer has not received "2#", it rejects the request. When the computer has received "2#", the flow advances to the path (A) and the computer executes a number retrieval process shown in FIG. 15.

At the beginning of the process shown in FIG. 15, the computer commands the exchange to send a number input announcement (see FIG. 15, S14). Then, the computer receives the number from the subscriber (see FIG. 15, S15). When the number that the computer has received starts with "XXX", the computer retrieves from the storage table A of the personal telephone directory (see FIG. 6) numbers which start with "XXX" (see FIG. 15, S16). When the computer could retrieve from the table at least one number which starts with "XXX", it sends the information containing the number (and its name) to the subscriber. Thus, the telephone set of the subscriber displays the information (see FIG. 15, S17).

Next, the computer determines whether or not it has received the flashing signal from the subscriber (see FIG. 15, S18). When the computer has not received the flashing signal within predetermined timing, it retrieves the next number (another data starting with "XXX" from the storage table A) (see FIG. 15, S19). When the computer has received the feature key B signal, it sends to the exchange a terminating command message for the number displayed (see FIG. 15, S20). When the exchange receives this message, it connects the sending subscriber to the displayed number.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method of controlling an advanced-function universal personal telecommunication service (UPT), for providing a service over an exchange network for a subscriber having a unique personal telecommunication number (PTN), said exchange network having an exchange control portion and a service control portion, said service control portion having a personal telecommunication number management table for storing data including a telephone number according to said personal telecommunication number and for executing said service according to first and second special numbers, said method comprising the steps of:

(a) dialing the first special number of said universal personal telecommunication service to activate said service control portion;

(b) sending to a sending subscriber a personal telecommunication number sending command;

(c) receiving information representing the personal telecommunication number of said sending subscriber or information representing a non-personal telecommunication number of said sending subscriber from said sending subscriber;

(d) checking said sending subscriber with said information;

(e) sending to said sending subscriber a receiving subscriber input command;

(f) receiving the personal telecommunication number or telephone number of said receiving subscriber from said sending subscriber;

(g) detecting the telephone number of said receiving subscriber using said personal telecommunication number management table when the personal telecommunication number of said receiving subscriber is received; and (h) connecting said sending subscriber to said receiving subscriber using the telephone number of said receiving subscriber received or detected, wherein, said step (a) is performed by said sending subscriber, said steps (b) to (g) are performed by said service control portion, and said step (h) is performed by said exchange control portion, wherein said service control portion is adapted to:

(a) be activated when receiving the second special number for a telephone number change and location-changing announcement process from a subscriber, (b) receive the personal telecommunication number of said subscriber, a telephone number to which a call is transferred, and time information about the time on which said telephone number can be changed or transferred, (c) store the personal telecommunication number of said subscriber, the telephone number, and the time information in the area according to the personal telecommunication number of said subscriber of said personal telecommunication number management table, (d) determine whether or not said subscriber is changing locations by using said personal telecommunication number management table when a call with the personal telecommunication number of said subscriber is received, (e) announce the changing of location of said subscriber to a calling subscriber of the call, when the call is received during the changing locations of said subscriber, and (f) transfer the call to the telephone number when the call is received after the time defined by the time information passes.

2. A method of controlling an advanced-function universal personal telecommunication service as set forth in claim 1, wherein said service control portion is adapted to (a) register in said personal telecommunication number management table a telephone number to be transferred for said subscriber and time information representing at what time the transferring is validated, (b) record in a moving subscriber call history table the personal telecommunication number and the time of the call taking place before the transferring valid time, and (c) announce to said subscriber the personal telecommunication number or directory number and time of each call stored in said moving subscriber history table when said subscriber dials a special number for a call history retrieval process.

3. A method of controlling an advanced-function universal personal telecommunication service, for providing a personal telephone directory service utilizing a unique personal telecommunication number assigned to a subscriber and providing a service over an exchange network with said personal telecommunication number, said exchange network having an exchange control portion and a service control portion, said method comprising the steps of:

(a) updating content of a telephone directory table or newly performing a registration in said telephone directory table when a call sent from said subscriber registered for said service is connected to a receiving subscriber, (b) calling a special number for a number retrieval process;

(c) sequentially sending to said subscriber information stored in said telephone directory table for said subscriber;

(d) receiving a sending request signal according to said information from said subscriber; and (e) calling and connecting said subscriber to a receiving subscriber according to said information, wherein said step (b) is performed by said subscriber and said steps (a) and (c) to (e) are performed by said service control portion, and wherein said service control portion has a personal telephone directory service control portion, and said personal telephone directory service control portion has a telephone directory table for storing the personal telecommunication number or telephone number of each receiving subscriber according to the personal telecommunication number of said subscriber and a call counter, wherein said telephone directory table has two tables according to each personal telecommunication number, one of which is adapted to register data taking place according to calls, the other of which is adapted to retrieve data from said telephone directory table, said two tables being adapted to be switched at predetermined intervals.

4. The method of controlling an advanced-function universal personal telecommunication service according to claim 3 wherein a retrieval of the storage table is conducted in the order of an access frequency corresponding to the value of said call counter.

5. The method of controlling an advanced-function universal personal telecommunication service according to claim 3 wherein said sequentially sending step comprises the steps of determining whether a sequential retrieval is conducted;

displaying information stored in a top of one of the storage table to the sending subscriber;

connecting the sending subscriber to a displayed subscriber when the sending subscriber requests it, and displaying information stored in the next position in said storage table when the sending subscriber does not request it.

6. The method of controlling an advanced-function universal personal telecommunication service according to claim 3 wherein said sequentially sending steps further comprises the steps of:

receiving from a sending subscriber a request for starting the retrieval at the bottom of the storage table; and displaying information stored in the bottom of the storage table to the sending subscriber.

7. A service control device as claimed in claim 3, wherein said personal telecommunication number is retrieved from said storage table in the order of an access frequency corresponding to the value of said call counter.

8. A method of controlling an advanced-function universal personal telecommunication service, for providing a personal telephone directory service utilizing a unique personal telecommunication number assigned to a subscriber and providing a service over an exchange network with said personal telecommunication number, said exchange network having an exchange control portion and a service control portion, said method comprising the steps of:

(a) updating content of a telephone directory table or newly performing a registration in said telephone directory table when a call sent from said subscriber registered for said service is connected to a receiving subscriber;

(b) calling a special number for a number retrieval process;

(c) sequentially sending to said subscriber information stored in said telephone directory table for said subscriber;

(d) receiving a sending request signal according to said information from said subscriber; and (e) calling and connecting said subscriber to a receiving subscriber according to said information, wherein said step (b) is performed by said subscriber and said steps (a) and (c) to (e) are performed by said service control portion, wherein said service control portion has a personal telephone directory service control portion, and said personal telephone directory service control portion has a telephone directory table for storing the personal telecommunication number or telephone number of each receiving subscriber according to the personal telecommunication number of said subscriber and a call counter, and wherein said sequentially sending steps comprises the steps of:
determining whether a number retrieval is conducted;
receiving some part of a first number corresponding to a receiving subscriber;
retrieving a second number, a part of which is coincident with said some part of the first number;
sending said second number to the sending subscriber;
connecting the subscriber to the second number when the subscriber requests the second number; and
retrieving the next number, a part of which is coincident with said part of the first number, when the subscriber does not request the second number.

9. A service control device for controlling an advanced-function universal personal telecommunication service (UPT), in which each subscriber has a unique personal telecommunication number (PTN), and for providing a service over an exchange network with said personal telecommunications number, said exchange network having an exchange control device, said service control device having a personal telecommunication number management table for storing data including a telephone number according to said personal telecommunication number and for executing said service according to first and second special numbers, said service control device, comprising:

means for receiving a call placed as a result of dialing the first special number of said universal personal telecommunication service;

means for sending to a sending subscriber a personal telecommunication number sending command;

means for receiving information representing said personal telecommunication number of said sending subscriber or information representing a non-personal telecommunication number of said sending subscriber from said sending subscriber;

means for checking said sending subscriber with said information;

means for sending to said sending subscriber a receiving subscriber input command;

means for receiving the personal telecommunication number of said receiving subscriber from said sending subscriber;

means for detecting the telephone number of said receiving subscriber using said personal telecommunication number management table when the personal telecommunication number of said receiving subscriber is received; and means for connecting said sending subscriber to said receiving subscriber using the telephone number of said receiving subscriber received to protect, wherein said service control device is adapted to:

(a) be activated when receiving the second special number for a telephone number change and location changing announcement process from a subscriber, (b) receive the personal telecommunication number of said subscriber, a telephone number to which a call is transferred, and time information about the time on which said telephone number can be changed or transferred, (c) store the personal telecommunication number of said subscriber, the telephone number, and the time information in the area according to the personal telecommunication number of said subscriber of said personal telecommunication number management table, (d) determine whether or not said subscriber is changing locations by using said personal telecommunication number management table when a call with the personal telecommunication number of said subscriber is received, (e) announce the changing of location of said subscriber to a calling sending subscriber of the call, when the call is received during the changing locations of said subscriber, and (f) transfer the call to the telephone number when the call is received after the time defined by the time information passes.

10. A service control device as claimed in claim 9, wherein said service control device further comprises:

means for registering in said personal telecommunication number management table a telephone number to be transferred for said subscriber and time information representing at what time the transferring is validated;

means for recording in a moving subscriber call history table the personal telecommunication number at the time of the call taking place before the transferring of valid; and means for announcing to said subscriber the personal telecommunication number or director number and a time of each call stored in said moving subscriber history table when said subscriber dials a special number of a call history retrieval process.

11. A service control device for controlling an advanced-function universal telecommunications service, for providing a personal telephone director service utilizing a unique personal telecommunication number assigned to a subscriber and providing a service over an exchange network with said personal telecommunication number, said exchange network having an exchange control device, said service control device comprising:

means for updating content of a telephone directory table or newly performing a registration in said telephone director table when a call sent from said subscriber registered for said service is connected to a receiving subscriber;

means for receiving a call placed as a result of dialing a special number for a number retrieval process;

sequentially sending means for sequentially sending to said subscriber information stored in said telephone directory table for said subscriber;

means for receiving a sending request signal according to said information from said subscriber; and means for connecting said subscriber to a receiving subscriber according to said information, wherein said service control device has a personal telephone directory service control device, and said personal telephone directory service control device has a telephone directory table for storing the personal telecommunication number or telephone number of each receiving subscriber according to the personal telecommunication number of said subscriber and a call counter, and wherein said telephone directory table has two tables according to each personal telecommunication number, one of which is adapted to register data taking place according to calls, the other of which is a adapted to retrieve data from said telephone directory table, said two tables being adapted to be switched at predetermined intervals.

12. A service control device as claimed in claim 11, wherein said sequentially sending means comprises:

means for displaying information stored in a top of one of the storage table to the sending subscriber; and means for connecting the sending subscriber to a displayed subscriber when the sending subscriber requests it, and when displaying information stored in the next position in said storage table when the sending subscriber does not request it.

13. A service control device as claimed in claim 11 wherein said sequentially sending means comprises:

means for receiving from a sending subscriber a request for starting the retrieval at the bottom of the storage table; and means for displaying information stored in the bottom of the storage table to the sending subscriber.

14. A service control device for controlling an advanced-function universal personal telecommunication service, for providing a personal telephone directory service utilizing a unique personal telecommunication number assigned to a subscriber and providing a service over an exchange network with said personal telecommunications number, said exchange network having an exchange control device, said service control device comprising:

means for updating content of a telephone directory table or means for newly performing a registration in said telephone directory table when a call sent from said subscriber registered for said service is connected to a receiving subscriber;

means for receiving a call placed as a result of dialing a special number for a number retrieval process;

sequentially sending means for sequentially sending to said subscriber information;

means for receiving a sending request signal according to said information from said subscriber; and means for connecting said subscriber to a receiving subscriber according to said information, wherein said service control device has a personal telephone director service control device, and said personal telephone directory service control device has a telephone directory table for storing the personal telecommunication number or telephone number of each receiving subscriber according to the personal telecommunication number of said subscriber and a call counter, and wherein said sequentially sending means comprises:

means for determining whether a number retrieval is conducted, means for receiving some part of a first number corresponding to receiving subscriber, means for receiving a second number, a part of which is coincident with said some part of the first number, means for sending said second number to the sending subscriber, means for connecting the subscriber to the second number when the subscriber requests the second number, and means for retrieving the next number, part of which is coincident with said part of the first number, when the subscriber does not request the second number.

\* \* \* \* \*